(12) United States Patent
Andersen

(10) Patent No.: US 9,463,526 B2
(45) Date of Patent: Oct. 11, 2016

(54) APPARATUS FOR WET GRINDING OF WELDING ELECTRODES, PARTICULARLY TUNGSTEN ELECTRODES

(71) Applicant: Jens Oien Andersen, Hadsund (DK)

(72) Inventor: Jens Oien Andersen, Hadsund (DK)

(73) Assignee: Jens Oien Andersen, Hadsund (DK)

( * ) Notice: Subject to any disclaimer, the term of this patent is extended or adjusted under 35 U.S.C. 154(b) by 11 days.

(21) Appl. No.: 14/409,000

(22) PCT Filed: Jun. 12, 2013

(86) PCT No.: PCT/DK2013/050192
§ 371 (c)(1),
(2) Date: Dec. 18, 2014

(87) PCT Pub. No.: WO2013/189497
PCT Pub. Date: Dec. 27, 2013

(65) Prior Publication Data
US 2015/0174684 A1  Jun. 25, 2015

(30) Foreign Application Priority Data
Jun. 18, 2012 (DK) .................. 2012 70340

(51) Int. Cl.
| B24B 27/00 | (2006.01) |
| B23K 9/32 | (2006.01) |
| B24B 19/16 | (2006.01) |
| B24B 41/06 | (2012.01) |
| B24B 55/02 | (2006.01) |

(52) U.S. Cl.
CPC ............... *B23K 9/328* (2013.01); *B24B 19/16* (2013.01); *B24B 27/0084* (2013.01); *B24B 41/067* (2013.01); *B24B 55/02* (2013.01)

(58) Field of Classification Search
CPC . B24B 19/16; B24B 27/0084; B24B 41/067; B24B 55/02; B24B 7/228; B24B 9/10; B23K 9/328; C03B 33/04; B28D 1/003; B28D 5/028
USPC .......................................................... 451/70
See application file for complete search history.

(56) References Cited

U.S. PATENT DOCUMENTS

| 3,747,284 | A | * | 7/1973 | Lyczko | ................... | B24B 55/02 409/136 |
| 4,547,999 | A | * | 10/1985 | Reiling | ................... | B24B 3/247 451/375 |
| 5,001,868 | A | * | 3/1991 | Jankus | ..................... | B24B 19/16 451/285 |
| 5,184,432 | A | * | 2/1993 | Wilson | ..................... | B23K 9/26 451/278 |
| 6,186,876 | B1 | * | 2/2001 | Christiansen | ........... | B24B 19/16 451/278 |
| 6,244,938 | B1 | * | 6/2001 | Ploeger | ................... | B23B 51/02 451/375 |

(Continued)

FOREIGN PATENT DOCUMENTS

| EP | 0822882 A1 | 2/1998 |
| EP | 1262279 A2 | 12/2002 |
| JP | 2008-137113 A | 6/2008 |

*Primary Examiner* — George Nguyen
(74) *Attorney, Agent, or Firm* — Fitch, Even, Tabin & Flannery LLP

(57) ABSTRACT

An apparatus (2, 22) for wet grinding of tungsten welding electrodes, comprising a drive motor for a rotating grinding wheel, means for fixing a welding electrode at a set angle relative to the grinding wheel (4), is disclosed comprising an angularly adjustable guide (6) for an electrode holder (8). The guide fixes the electrode holder at varying angular positions relative to a plane front side of the grinding wheel. A disc-shaped cutting device shortens the welding electrodes to a defined length.

13 Claims, 4 Drawing Sheets

(56) References Cited

U.S. PATENT DOCUMENTS

| | | | | |
|---|---|---|---|---|
| 6,331,133 B1 * | 12/2001 | Katayama | | B24B 3/26 451/10 |
| 6,645,055 B1 * | 11/2003 | Olsen | | B24B 5/14 451/259 |
| 6,865,787 B2 * | 3/2005 | Shingai | | B23B 5/00 29/28 |
| 7,014,542 B1 * | 3/2006 | Lu | | B24B 13/01 451/461 |
| 7,552,504 B1 * | 6/2009 | Sorreles | | B23K 9/32 15/316.1 |
| 9,022,838 B2 * | 5/2015 | Tamm | | B24B 19/16 451/294 |
| 2008/0076339 A1 * | 3/2008 | Ido | | B24B 45/003 451/450 |
| 2013/0288580 A1 * | 10/2013 | Tamm | | B23K 11/3063 451/363 |

\* cited by examiner

APPARATUS FOR WET GRINDING OF WELDING ELECTRODES, PARTICULARLY TUNGSTEN ELECTRODES

CROSS REFERENCE TO RELATED APPLICATIONS

Reference is made to Danish Patent Application Serial No. DK 2012 703 40, filed Jun. 18, 2012 and PCT Patent Application PCT/DK2013/050129, filed on Jun. 12, 2013, which applications are incorporated herein by reference in their entirety.

BACKGROUND OF THE INVENTION

1. Field of the Invention

The present invention concerns an apparatus for wet grinding of welding electrodes, such as tungsten electrodes.

2. Description of the Prior Art

For use in TIG welding (tungsten inert gas welding) and plasma welding, tungsten welding electrodes are used to achieve weld seams of high quality which have a well-defined pointed end. Surface properties as well as dimensions of the electrode point have particular significance in generating the required electric arc produced by the electrodes which melts the welding wire for producing the weld seam.

At the same time, the welding electrode is subjected to heavy wear due to the temperatures occurring at the site of welding operation. After a short period of time, the welding electrode is not capable of producing weld seams of high quality. In practice, the welder carries welding electrodes in order to replace them in the welding equipment. Alternatively, the welding electrodes are to ground again which, however, requires that the workplace has a mobile electrode grinding apparatus.

Grinding apparatuses of this type normally operate with a rotating grinding wheel which grinds the welding electrodes to a point by pressing the electrodes against a side face of the grinding wheel at a desired angle. This grinding principle makes it complicated to vary the grinding angle or the point of the electrodes.

It is known that this grinding principle and apparatus have unsolved work environmental problems in connection with the aggressive grinding which produces dust formed by grinding welding electrodes containing tungsten.

DK/EP 0822882 T3 discloses an apparatus for grinding welding electrodes, in particular tungsten electrodes. The apparatus includes a drive motor for a rotating grinding wheel and apparatus adapted to fix a welding electrode at a certain angle relative to the grinding wheel, wherein the fixing apparatus includes a part which is held in a vertically extending guide and is displaceable in parallel with the plane of the grinding wheel. This apparatus has two mutually displaced insertion openings or positions for an electrode holder which are a first insertion opening or position opposite an arched angle scale corresponding to the radius of the grinding wheel, and a second insertion opening or position situated for fastening the electrode in parallel with the plane of the grinding wheel with the vertical spacing between the insertion openings being equal to the spacing between the arched angle scale and the grinding wheel.

SUMMARY OF THE INVENTION

The invention is an improved apparatus for wet grinding of welding electrodes of the kind described above and which uses simple measures to make it easier to adjust the grinding angle. Furthermore, the apparatus according to the invention addresses the work environment problems which are known in connection with dry grinding of tungsten electrodes.

The grinding apparatus according to the invention is peculiar in that the fixing apparatus includes an angularly adjustable guide for an electrode holder. The guide is fixable at varying angular positions relative to a plane front side of the grinding wheel. The apparatus furthermore includes a disc-shaped cutting device which cites the electrodes to shorten the welding electrodes to a defined length.

By simple technical measures it is possible to simplify adjustment of the grinding angle while at the same time addressing the work environment problems associated with grinding of tungsten electrodes in that the grinding of welding electrodes is performed by wet grinding.

The apparatus according to the invention is designed so that the cutting device is driven by connection with the drive motor which is preferably by a belt drive.

The optimizing of collection of metal particles from the cutting device in accordance with the invention may advantageously be such that the cutting device directs metal particles from a cutting disc in operation towards a back wall in the grinding housing. The back wall is sprinkled with grinding liquid on which is supplied from the top of the grinding wheel.

The direct reading of the actual angle setting is enabled with a digital display which shows the actual angular position of the guide.

The electrode holder provides the ability to manually clamp the welding electrode to be ground in a simple and exact way. Therefore, individual variations of specific lengths of welding electrodes do not cause any problems.

Correspondingly, the apparatus according to the invention can be substantially simplified by the electrode holder being manually rotatable in the guide during grinding of the welding electrode.

The apparatus according to the invention may suitably include an adjusting device for adjusting the length of the welding electrode.

In addition, the apparatus according to the invention may advantageously have an upper annular part of the guide provides a fine stepwise adjustment of an active length of the welding electrode for flat grinding of an outermost end of the welding electrode.

In practice, this fine adjustment includes a stepwise rotation of the upper annular part guided by a number of locking balls—where for example each click adjusts the active length of the welding electrode by 0.1 mm—such that three clicks will correspond to an actual upwards displacement of the welding electrode by 0.3 mm. The flat grinding is effected by rotating the guide for the electrode holder to a position where the welding electrode stands at right angles to the front side of the grinding wheel.

The service life of the grinding wheel is optimized by the guide having lateral displacement relative to the plane front side of the grinding wheel.

BRIEF DESCRIPTION OF THE DRAWINGS

The invention is now described more closely in connection with the drawings, in which like reference numerals are used throughout and.

DETAILED DESCRIPTION OF THE EMBODIMENTS OF THE INVENTION

Figure 1:
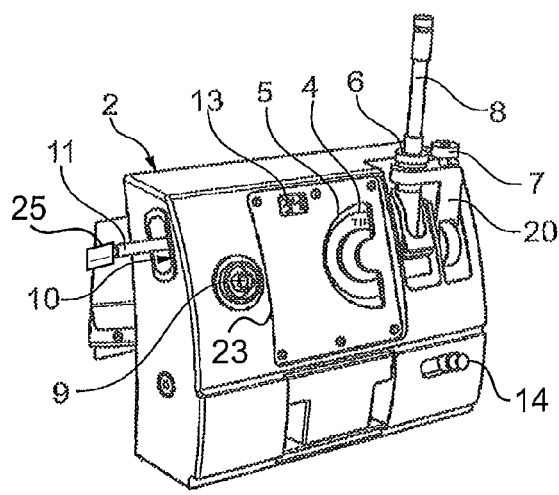
FIG. 1 shows a perspective view of an embodiment of an apparatus according to the invention.

The apparatus 1 shown in FIG. 1 includes a rearwardly directed housing part 24 including cover plate 25 which contains a drive motor for rotating a grinding wheel 4. The plane front side is visible through a curving window 5 of cover plate 23 at the front side of the apparatus 2.

Figure 11:
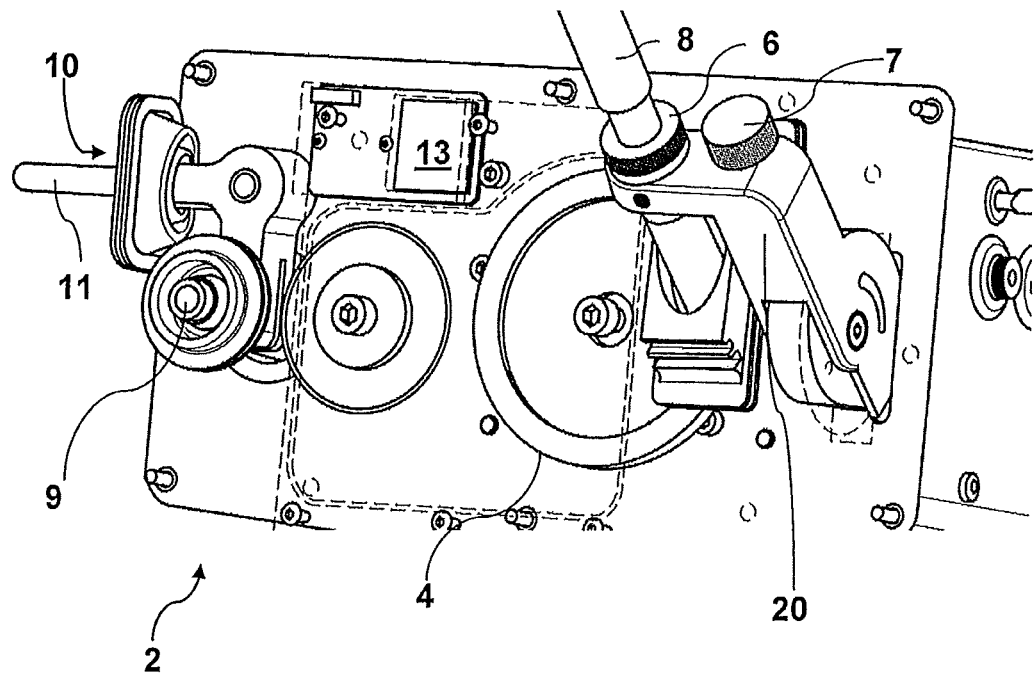
FIG. 11 is a view of FIG. 1 with the cover plate 23 removed.
Figure 12:
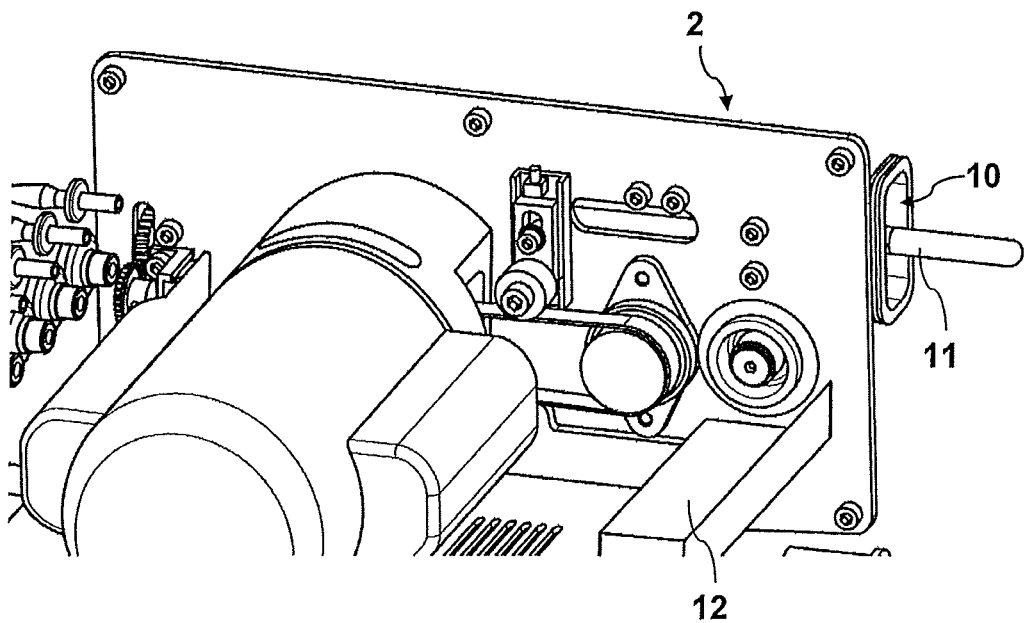
FIG. 12 is view of FIG. 10 with the cover plate 24 removed.

FIG. 11 shows FIG. 1 from the rear side.

To the right of the window 5, an angularly adjustable guide 6 is provided for an electrode holder 8 to which guide 6 can be fixed at various angular positions relative to the plane front side of the grinding wheel 4 by a fixing screw 7.

To the left of the window 5, an insertion opening 9 of a cutting device 10 can be seen. A welding electrode can be inserted in the insertion opening 9 to cut off a part of the length of the welding electrode for forming a cut off end of the electrode which is subsequently ground into a point by the apparatus 2.

The insertion opening 9 can advantageously be angled 1-2° relative to the plane of the cutting device.

Figure 9:
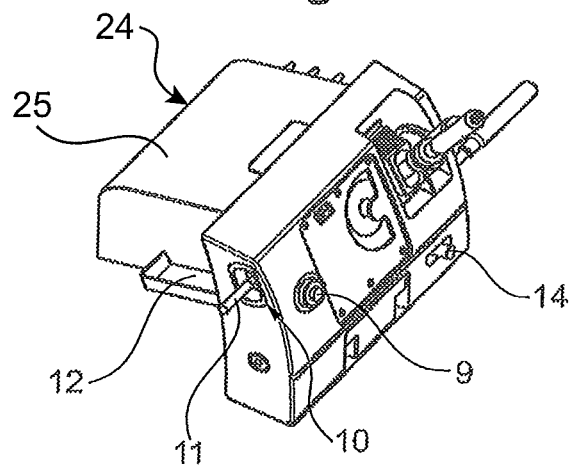
FIG. 9 shows a perspective view of the apparatus in FIG. 8, as seen from the back side.
Figure 10:
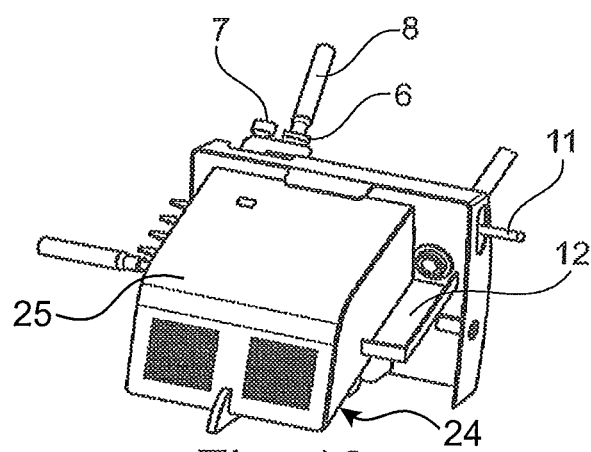
FIG. 10 shows a perspective view of the apparatus shown in FIG. 8, as seen from the back side.

At the left side of the apparatus 2 an operating lever 11 of the cutting device 10 is provided. By moving the operating lever 11 downwards, a rotating cutting disc is pressed against the side of the welding electrode such that an outer end part thereof is cut off and is projected into a collecting channel 12 at the back side of the apparatus 2 (FIGS. 9 and 10).

The rotating cutting disc of the cutting device 10 is driven by connection to grinding wheel 4 by a belt drive.

Figure 2:
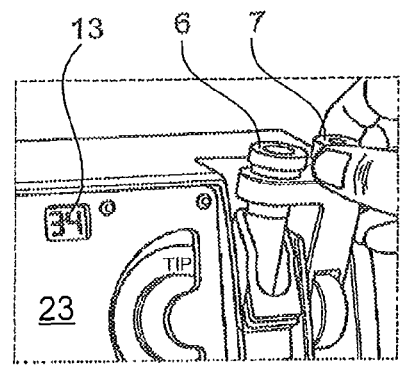
FIG. 2 shows a detailed perspective view of the angular adjustment by the apparatus shown in FIG. 1.
Figure 3:
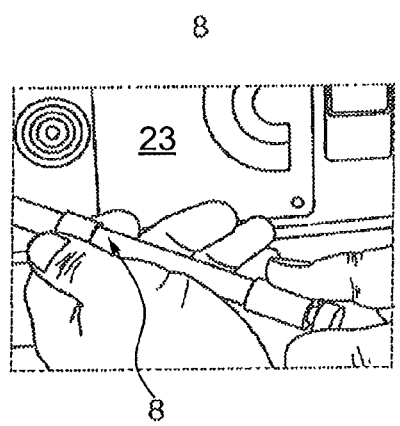
FIG. 3 shows a detailed perspective view of the electrode holder for use in the apparatus shown in FIG. 1.

In FIG. 2 a digital display 13 is visible which clearly shows the actual sensed angular position of the guide 6 for the electrode holder 8 relative to the plane front side of the grinding wheel 4 such as 34°. FIG. 3 shows that the electrode holder 8 is manually operated for clamping an electrode point in a known chuck with three-partite grip jaws.

Figure 4:
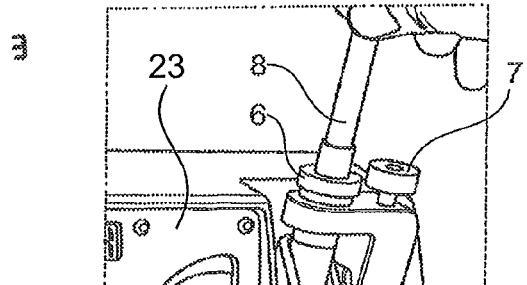
FIG. 4 shows a detailed perspective view for illustrating how the electrode holder is rotated manually during grinding.

FIG. 4 shows the electrode holder 8 being rotatable by hand during grinding of an electrode end into a point by pressing thereof against the plane front side of the grinding wheel 4.

Figure 5:
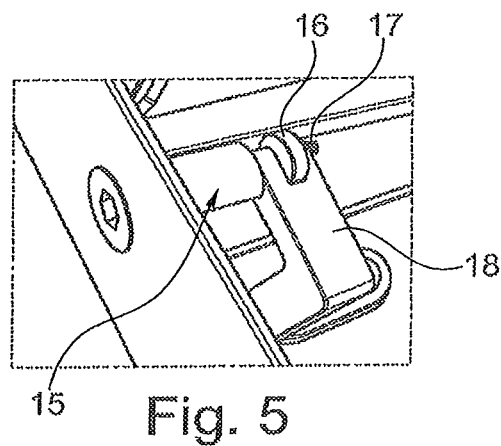
FIG. 5 shows a detailed perspective view of a mechanism for setting a correct length of the electrode.

In FIG. 9, a set screw 14 is located under the pivotable guide 6. The screw 14 is associated with the device 15 shown in FIG. 5 for adjusting in a stepwise manner the length of the electrode point. The adjustment itself is effected by rotation of a knurled nut 16 mounted on a threaded rod 17 connected to an angular holder 18, which can be displaced laterally.

Figure 6:
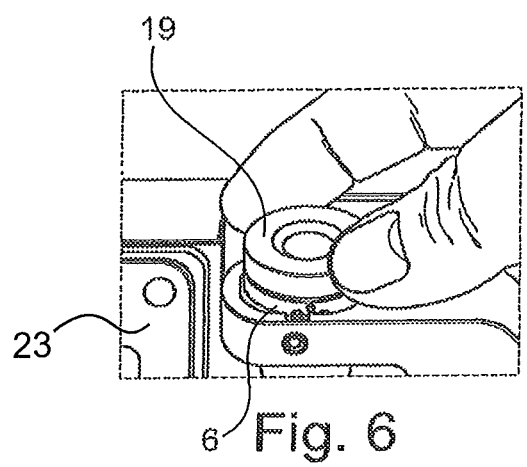
FIG. 6 shows a detailed perspective view of an upper rotatable ring used for retracting the electrode point 0.1 mm per click for grinding the outermost point of the electrode flat.

FIG. 6 shows that an upper annular part 19 of the guide 6 can be turned clickwise. Each click represents a longitudinal displacement of the guide of 0.1 mm in view of the annular part 19 being connected with the guide by a locking ball that interacts with a number of complementarily shaped recesses.

Three clicks thus correspond to a longitudinal displacement of 0.3 mm which displaces the ground electrode point in direction away from the grinding wheel 4 before the guide 6 subsequently is pivoted into a position perpendicular to the plane front side of the grinding wheel 4. At this position, an exact plane grinding of the outermost part of the electrode into a point can then be performed by moving it against the grinding wheel 4 again.

Figure 7:
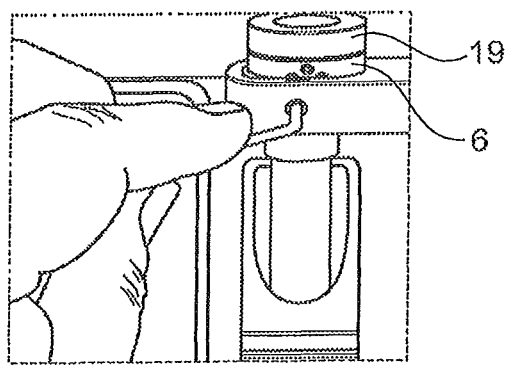
FIG. 7 shows a detailed perspective view for illustrating how the electrode holder can be laterally displaced for better utilization of the grinding wheel.

FIG. 7 indicates that the guide 6 itself is laterally displaceable relative to a pivoting mechanism 20. A substantial increase is achieved in the capacity of the grinding wheel 4 which may be reused a number of times corresponding to the possible lateral displacement of the guide which for example may have three grinding tracks on the grinding wheel 4.

Figure 8:
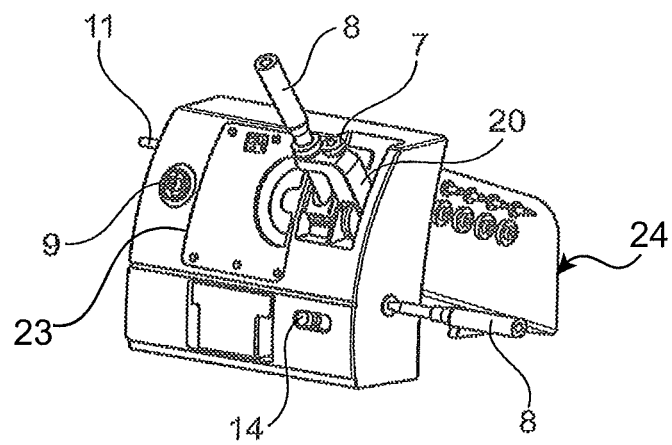
FIG. 8 shows a perspective view of a preferred embodiment of an apparatus according to the invention.

FIGS. 8-10 show a modified embodiment of a grinding apparatus 22 according to the invention where similar parts are denoted with the same reference numbers.

REFERENCE NUMBERS OF THE DRAWINGS 2 grinding apparatus (FIGS. 1-7)
4 grinding wheel
5 window
6 guide
7 fixing screw
8 electrode holder
9 insertion opening
10 cutting device
11 operating arm
12 collection channel
13 digital display
14 set screw
15 adjusting device
16 knurled nut
17 threaded part
18 angular holder
19 annular part
20 pivoting mechanism
22 grinding apparatus (FIGS. 8-10)
23 front cover plate
24 housing part
25 cover place

The invention claimed is:

1. An apparatus for wet grinding tungsten welding electrodes to have pointed ends, comprising:
   a drive motor for rotating a grinding wheel which extends into a grinding liquid contained in a grinding housing, means for fixing a welding electrode at a set angle relative to the grinding wheel and a cutting device for cutting the welding electrodes to shorten a length of the welding electrodes and an angularly adjustable guide for adjusting an angle at which electrodes are held by an electrode holder attached to the guide during grinding and wherein the guide varyies angular positions of the electrode holder holding an electrode relative to a planar front side of the grinding wheel.

2. An apparatus according to claim 1, wherein the cutting device is driven by a belt drive coupled to the motor.

3. An apparatus according to claim 1, comprising a digital display for showing an angular position of the electrode relative to the grinding wheel.

4. An apparatus according to claim 1, wherein:
the electrode holder includes a manually operated clamp for clamping the welding electrode in a fixed position for grinding a point on the clamped welding electrode with the grinding wheel.

5. An apparatus according to claim 2, wherein:
the electrode holder includes a manually operated clamp for clamping the welding electrode in a fixed position for grinding a point on the clamped welding electrode with the grinding wheel.

6. An apparatus according to claim 3, wherein:
the electrode holder includes a manually operated clamp for clamping the welding electrode in a fixed position for grinding a point on the clamped welding electrode with the grinding wheel.

7. An apparatus according to claim 1, wherein:
the electrode holder is configured to provide manual rotation of the welding electrode in the guide during grinding of the welding electrode.

8. An apparatus according to claim 2, wherein:
the electrode holder is configured to provide manual rotation of the welding electrode in the guide during grinding of the welding electrode.

9. An apparatus according to claim 3, wherein:
the electrode holder is configured to provide manual rotation of the welding electrode in the guide during grinding of the welding electrode.

10. An apparatus according to claim 4, wherein:
the electrode holder is configured to provide manual rotation of the welding electrode in the guide during grinding of the welding electrode.

11. An apparatus according to claim 1, comprising a cutter for cutting a length of the welding electrode prior to grinding.

12. An apparatus according to claim 1, wherein:
an upper part of the guide includes means for providing stepwise adjustment of length of the welding electrode relative to the grinding wheel during grinding of an end of the welding electrode.

13. An apparatus according to claim 1, wherein:
the guide includes means for laterally displacing the grinding wheel relative to a plane front side of the grinding wheel which grinds the electrodes.

\* \* \* \* \*